United States Patent
Kito et al.

(10) Patent No.: US 10,559,076 B2
(45) Date of Patent: Feb. 11, 2020

(54) COMPONENT TYPE AUTOMATIC DISTINGUISHING METHOD, COMPONENT TYPE AUTOMATIC DISTINGUISHING SYSTEM, IMAGE PROCESSING COMPONENT DATA CREATION METHOD, AND IMAGE PROCESSING COMPONENT DATA CREATION SYSTEM

(71) Applicants: FUJI CORPORATION, Chiryu-shi (JP); NAGOYA INSTITUTE OF TECHNOLOGY, Nagoya (JP)

(72) Inventors: Shuichiro Kito, Chiryu (JP); Taizo Umezaki, Kasugai (JP); Koosuke Hattori, Nagoya (JP)

(73) Assignees: FUJI CORPORATION, Chiryu-shi (JP); NAGOYA INSTITUTE OF TECHNOLOGY, Nagoya (JP)

( * ) Notice: Subject to any disclaimer, the term of this patent is extended or adjusted under 35 U.S.C. 154(b) by 46 days.

(21) Appl. No.: 15/556,056

(22) PCT Filed: Mar. 11, 2015

(86) PCT No.: PCT/JP2015/057220
§ 371 (c)(1),
(2) Date: Sep. 6, 2017

(87) PCT Pub. No.: WO2016/143106
PCT Pub. Date: Sep. 15, 2016

(65) Prior Publication Data
US 2018/0047145 A1 Feb. 15, 2018

(51) Int. Cl.
*G06T 7/00* (2017.01)
*G06T 1/00* (2006.01)
(Continued)

(52) U.S. Cl.
CPC .............. *G06T 7/001* (2013.01); *G06K 9/522* (2013.01); *G06K 9/6202* (2013.01);
(Continued)

(58) Field of Classification Search
CPC ........... G06T 7/001; G06T 2207/30148; G06T 2207/20048; G06K 9/522; G06K 9/6256; G06K 9/6202
See application file for complete search history.

(56) References Cited

U.S. PATENT DOCUMENTS

| | | | |
|---|---|---|---|
| 6,647,132 B1 * | 11/2003 | Montillo | G06T 7/11 382/108 |
| 2004/0208353 A1 * | 10/2004 | Murakami | G01N 21/956 382/145 |

(Continued)

FOREIGN PATENT DOCUMENTS

JP 2006-338482 A 12/2006

OTHER PUBLICATIONS

International Search Report dated May 26, 2015 in PCT/JP2015/057220 filed Mar. 11, 2015.

*Primary Examiner* — Mia M Thomas
(74) *Attorney, Agent, or Firm* — Oblon, McClelland, Maier & Neustadt, L.L.P.

(57) ABSTRACT

Characteristic data of a relevant component is extracted from a component image captured by camera, and the extracted characteristic data is compared with reference characteristic data of multiple types of component registered in a database to distinguish a type of component for which the two sets of data match most closely. As a result of this, a power spectrum image is created by applying an FFT for each scanning line to a lead presence candidate region corresponding to a candidate for a lead being present in a component image distinguished as an odd form component. Further, an HLAC characteristic is calculated from the
(Continued)

power spectrum image in order to extract a periodic characteristic of the power spectrum image, and a connector component with leads is distinguished from an odd form component by learning a characteristic amount of the LAC characteristic using an SVM.

8 Claims, 14 Drawing Sheets

(51) Int. Cl.
 *G06K 9/62* (2006.01)
 *G06K 9/52* (2006.01)
(52) U.S. Cl.
 CPC ......... *G06K 9/6256* (2013.01); *G06K 9/6269* (2013.01); *G06T 1/00* (2013.01); *G06T 7/00* (2013.01); *G06K 2209/19* (2013.01); *G06T 2207/20048* (2013.01); *G06T 2207/30148* (2013.01)

(56) References Cited

U.S. PATENT DOCUMENTS

| | | | |
|---|---|---|---|
| 2006/0210479 A1* | 9/2006 | Young | A61K 31/555 424/9.363 |
| 2009/0110232 A1* | 4/2009 | Khodor | G01J 5/0003 382/100 |
| 2010/0246915 A1* | 9/2010 | Yamakoshi | A61B 6/032 382/131 |
| 2010/0321555 A1* | 12/2010 | Takeshita | H01L 27/14618 348/340 |
| 2012/0004887 A1* | 1/2012 | Kawaguchi | G06F 3/017 702/150 |
| 2012/0200871 A1* | 8/2012 | Takahashi | G03G 21/1652 358/1.9 |
| 2013/0038633 A1* | 2/2013 | Maggiore | B01D 65/104 345/633 |
| 2014/0193060 A1* | 7/2014 | Tanji | G06T 7/0014 382/133 |
| 2017/0147856 A1* | 5/2017 | Kito | G06T 7/62 |
| 2018/0076221 A1* | 3/2018 | Hanari | H01L 27/1203 |

* cited by examiner

IC component

Chip component

Mini mold component

Simple shape connector component

BGA component

Odd form component

Complex shape connector component (1)

Complex shape connector component (2)

(a) Normalization (b) Averaging (b) Lead presence candidate region image power spectrum image (a) Example of image of odd form component incorrectly distinguished as connector component (b) Lead presence candidate region image power spectrum image (a) Example of image of connector component incorrectly distinguished as odd form component

COMPONENT TYPE AUTOMATIC DISTINGUISHING METHOD, COMPONENT TYPE AUTOMATIC DISTINGUISHING SYSTEM, IMAGE PROCESSING COMPONENT DATA CREATION METHOD, AND IMAGE PROCESSING COMPONENT DATA CREATION SYSTEM

TECHNICAL FIELD

The present application relates to a component type automatic distinguishing method, a component type automatic distinguishing system, an image processing component data creation method, and an image processing component data creation system in which the performance of distinguishing a connector component with leads is improved.

BACKGROUND ART

In recent years, as disclosed in PTL 1 (JP-A-2006-338482), a hierarchical type technique using matching by dynamic programming (DP) has been proposed as a technique for automatically distinguishing a type of component mounted by a component mounting machine. The technique extracts, from a component image captured by a camera, characteristic data, which is data that represents characteristics of a relevant component, compares the extracted characteristic data with reference characteristic data of multiple types of component registered in a database, and automatically distinguishes a type of component for which the two sets of data match most closely.

CITATION LIST

Patent Literature

PTL 1: JP-A-2006-338482

SUMMARY

Technical Problem

In the component type distinguishing method of PTL 1, high distinguishing performance is obtained for images of general components such as IC components having leads on the sides, chip components, mini mold components, connector components having simple shapes, and BGA components such as those shown in FIGS. 2A to 2E, but images of connector components having complicated shapes such as those shown in FIGS. 2G and 2H are not distinguished as connector components, and are incorrectly distinguished as odd form components such as that shown in FIG. 2F. Despite being connector components with leads, which is a typical shape of an electronic component, such connector components are not distinguished as connector components with leads, and therefore, there is a problem in that an image processing algorithm, which detects damage and bending of a lead, is not automatically selected. In addition, in PTL 1, image processing component data is created by extracting characteristic data (data such as the positions and sizes of a body, a lead, a bump, and the like) of a component from an image of the component in accordance with a type of the component that is distinguished automatically, but since connector components having complicated shapes such as those shown in FIGS. 2G and 2H are incorrectly distinguished as odd form components, there is a problem in that it is not possible to create suitable image processing component data.

Thus, the problem solved by the present disclosure is distinguishing a connector component with leads from an odd form component.

Solution to Problem

In order to distinguish a connector component with leads from an odd form component, the present disclosure focuses on the periodic way leads are lined up, and includes, in order to extract a periodic characteristic from the component image, a power spectrum image creation process (a power spectrum image creation means) for creating a power spectrum image from a component image using a fast Fourier transform (FFT), a higher-order local auto-correlation (HLAC) characteristic extraction process (an HLAC characteristic extraction means) for calculating an HLAC characteristic from the power spectrum image in order to extract a periodic characteristic of the power spectrum image, and a connector component distinguishing process (a connector component distinguishing means) for distinguishing whether the component is a connector component with leads using the higher-order local auto-correlation characteristic.

In this case, periodic vertical stripes arising from periodicity of leads arranged at equal pitch are formed in a power spectrum image created from an image of a connector component with leads, but periodic vertical stripes are not formed in a power spectrum image of a component not having a lead.

Focusing on this characteristic, in the present disclosure, a higher-order local auto-correlation characteristic is calculated from the power spectrum image as a characteristic amount for distinguishing whether vertical stripes are included in the power spectrum image, and it is distinguished whether the component is a connector component with leads using the higher-order local auto-correlation characteristic, and as a result of this, it is possible to distinguish a connector component with leads from an odd form component.

However, even in a case of an image of a connector component with leads, among the image, periodic vertical stripes are not formed in a power spectrum image created from a region in which a lead is not present. In such an instance, the power spectrum image may be created by, among a component image, applying a fast Fourier transform for each scanning line to a region corresponding to a candidate for a lead being present. Generally, since there is a high probability that a lead will be attached toward an outside direction from a body portion of a component and will be present in a region in the vicinity of the outer periphery of a component, the power spectrum image may be created by setting, among a component image, the region in the vicinity of the outer periphery of the component to be a "region corresponding to a candidate for a lead being present". As a result of this, it is possible to extract a periodic characteristic by, among a component image, narrowing a region to a region in which there is a high probability that a lead will be present.

In addition, the present disclosure may distinguish whether the component is a connector component with leads by learning a characteristic amount of the higher-order local auto-correlation characteristic using a support vector machine (SVM). As a result of this, it is possible to distinguish a connector component with leads with high accuracy.

In a case in which the present disclosure is implemented, for example, IC components having leads on four sides, chip components, mini mold components, and connector components having simple shapes, such as those shown in FIGS. 2A to 2E may be distinguished using the same method as the above-mentioned component type automatic distinguishing method disclosed in document 1, and a connector component with leads may be distinguished from an odd form component by performing the power spectrum image creation process, the HLAC characteristic extraction process, and the connector component distinguishing process for component images distinguished to be odd form components that do not correspond to the above-mentioned components. As a result of this, it is possible to automatically distinguish, with high accuracy, the type of all components to be mounted by a component mounting machine.

Image processing component data may be created by extracting characteristic data of a relevant component from a component image in accordance with the type of the component to be distinguished by using the component type automatic distinguishing method of the present disclosure, and an image processing algorithm that detects damage and bending of a lead may be automatically selected in a case in which a component is distinguished as a connector component with leads. As a result of this, it is possible to resolve the above-mentioned problems of the related art.

DESCRIPTION OF EMBODIMENTS

Figure 1:
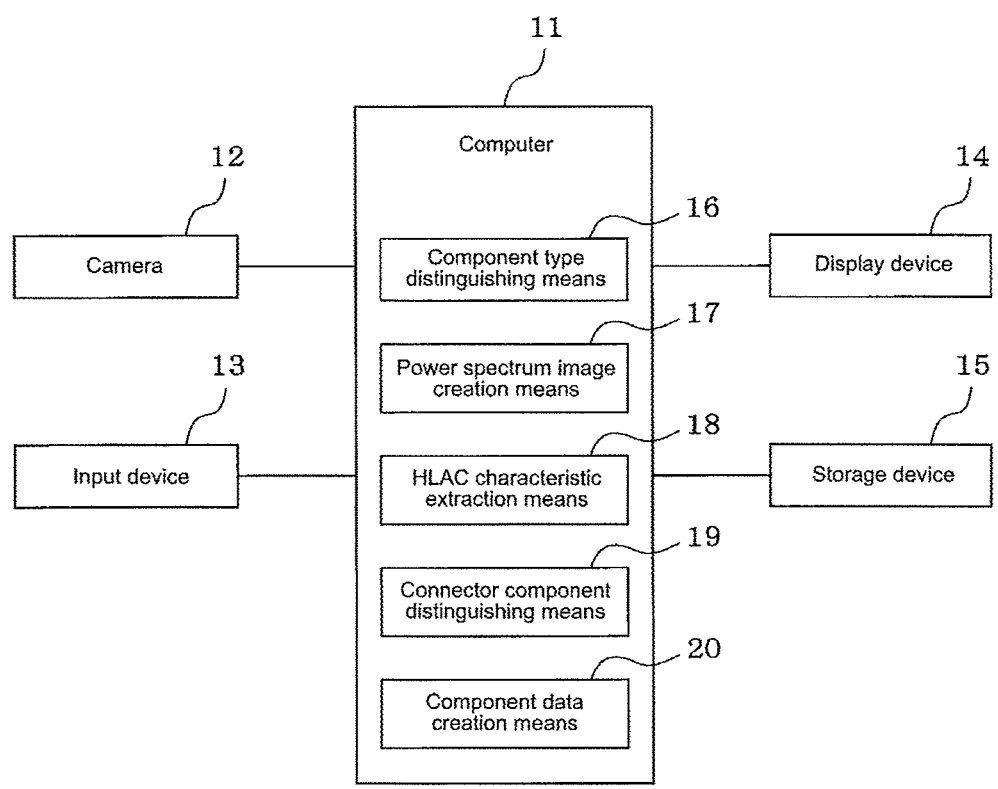
FIG. 1 is a block diagram that shows a configuration of a component type automatic distinguishing system (an image processing component data creation system) of an example of the present disclosure.

Hereinafter, an embodiment which realizes forms for implementing the present disclosure will be described. The component type automatic distinguishing system of the present example is installed with a function of an image processing component data creation system, and as shown in FIG. 1, has a configuration that is provided with computer 11 such as a personal computer, camera 12 having a built-in image sensor such as a CMOS sensor that acquires a grayscale image by capturing an image of a component corresponding to a subject for component type distinguishing (a subject for creation of subject of image processing component data), input device 13 such as a keyboard, a mouse, or a touch panel, display device 14 such as a CRT or a liquid crystal display, and storage device 15 that stores a component type automatic distinguishing program of FIG. 8, which will be mentioned later, an image processing component data creation program, various data, and the like.

The component type automatic distinguishing system (image processing component data creation system) may be configured using a control system of a component mounting machine, or may use a dedicated system (for example, a combination of a desktop imaging device and a personal computer) configured separately from a control system of the component mounting machine. In a case in which a component type automatic distinguishing system (image processing component data creation system) is configured using a control system of a component mounting machine, camera 12 may use a camera (a so-called parts camera) that captures an image of a component held by a suction nozzle of the component mounting machine from below.

Figure 8:
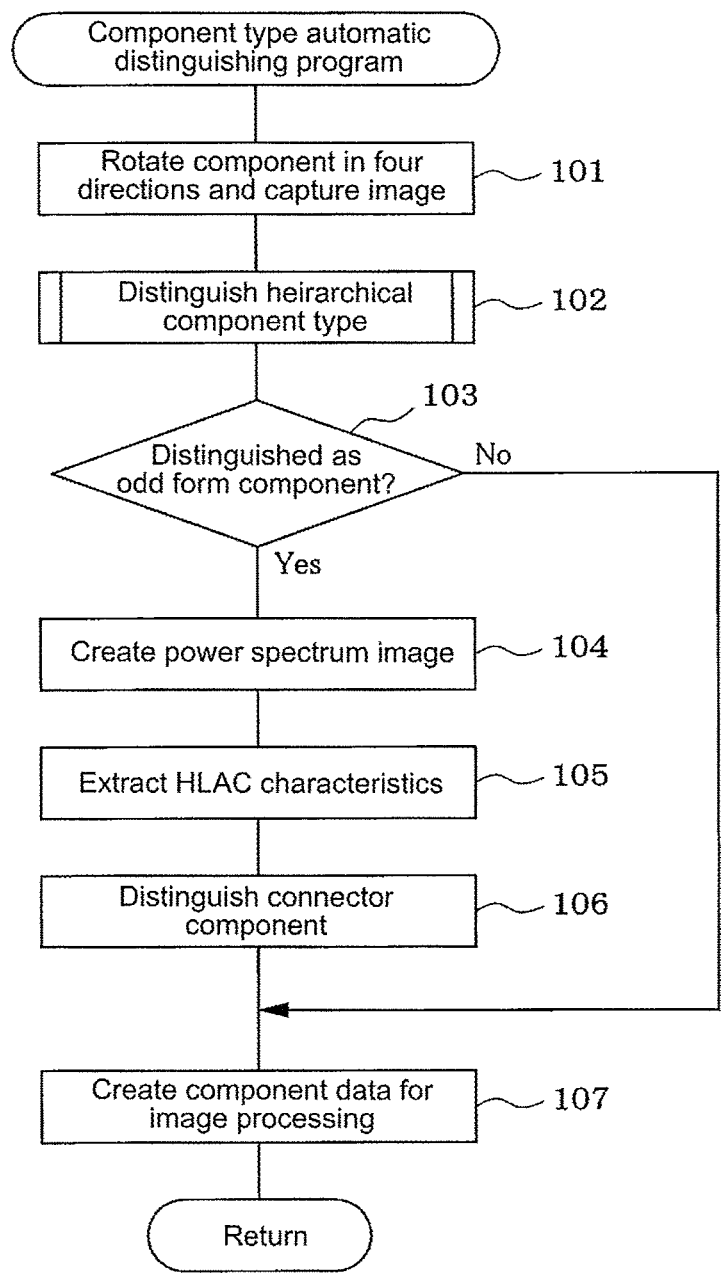
FIG. 8 is a flowchart that shows a flow of processes of a component type automatic distinguishing program.

Computer 11 functions as component type distinguishing means 16 for extracting characteristic data of a relevant component from a component image captured by camera 12 as a result of executing the component type automatic distinguishing program of FIG. 8, which will be mentioned later, and comparing the extracted characteristic data with reference characteristic data of multiple types of component registered in a database to distinguish a type of component for which the two sets of data match most closely, functions as power spectrum image creation means 17 for creating a power spectrum image using a fast Fourier transform (FFT) for a component image discriminated to be an odd form component by the component type discrimination means 16, further functions as higher-order local auto-correlation (HLAC) characteristic extraction means 18 for calculating an HLAC characteristic from a power spectrum image in order to extract a periodic characteristic of the power spectrum image, and functions as connector component distinguishing means 19 for distinguishing whether a component is a connector component with leads using the HLAC characteristic.

Power spectrum image creation means 17 creates a power spectrum image by applying an FFT for each scanning line to a lead presence candidate region corresponding to a candidate for a lead being present in the component image. Connector component discrimination means 19 distinguishes a connector component with leads from an odd form component by learning a characteristic amount of the HLAC characteristic using a support vector machine (SVM). Furthermore, in the present example, computer 11 also functions as component data creation means 20 that creates image processing component data by extracting characteristic data (the size, lead position, lead number, lead interval, lead width, lead length, position of a bump, or the like, of a body portion) of a component from a component image in accordance with a distinguishing result of component type. These functions will be described below.

Figure 2A:
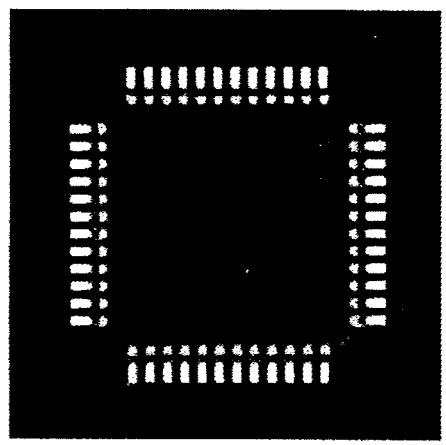
FIG. 2A is a view that shows an image of an IC component having leads on four sides.
Figure 2B:
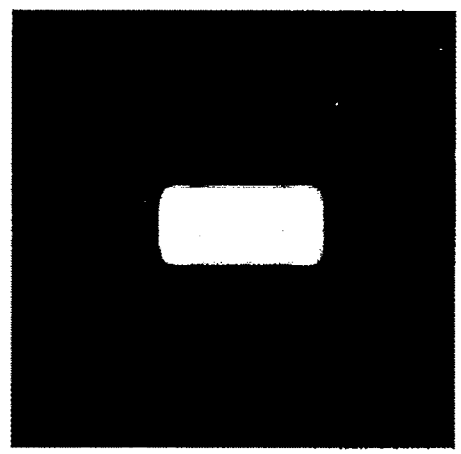
FIG. 2B is a view that shows an image of a chip component.
Figure 2C:
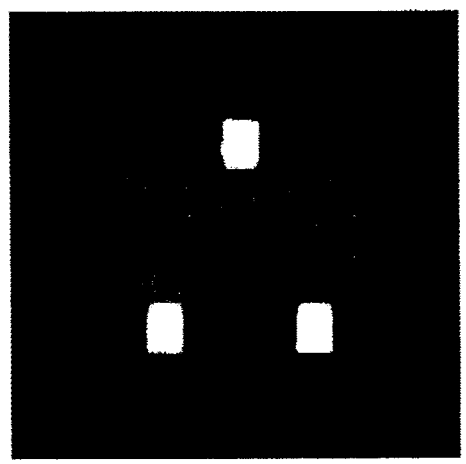
FIG. 2C is a view that shows an image of a mini mold component.
Figure 2D:
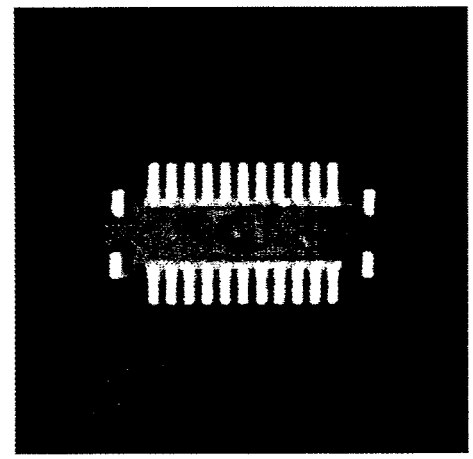
FIG. 2D is a view that shows an image of a connector component having a simple shape.
Figure 2E:
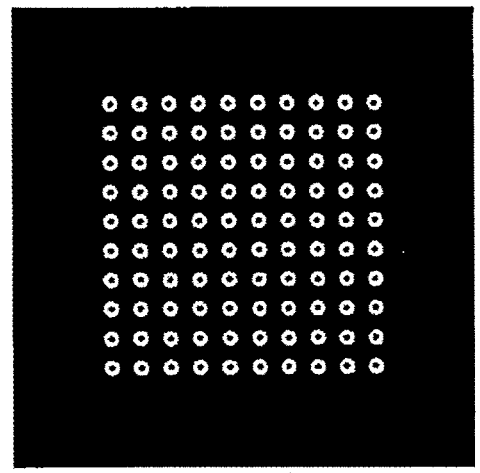
FIG. 2E is a view that shows an image of a BGA component.
Figure 2F:
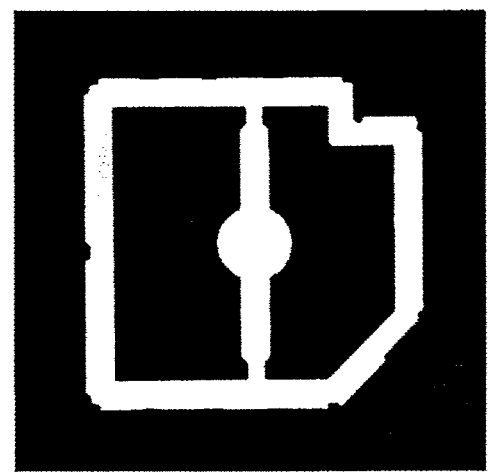
FIG. 2F is a view that shows an image of an odd form component.
Figure 2G:
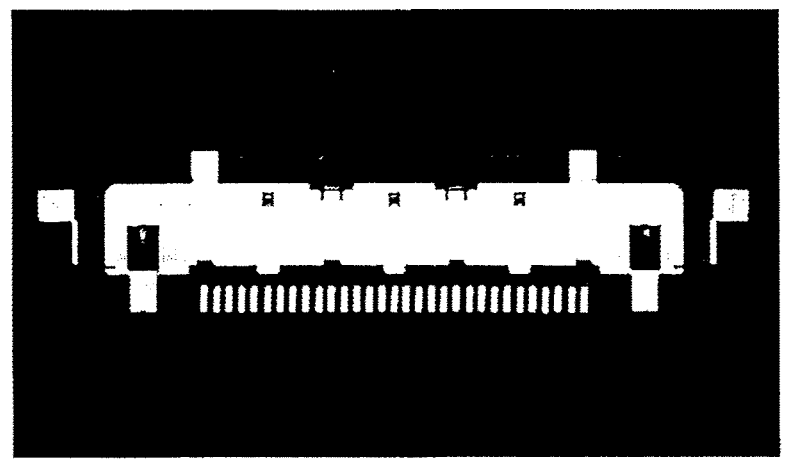
FIG. 2G is a view that shows an image of a connector component having a complex shape (1 of 2).
Figure 2H:
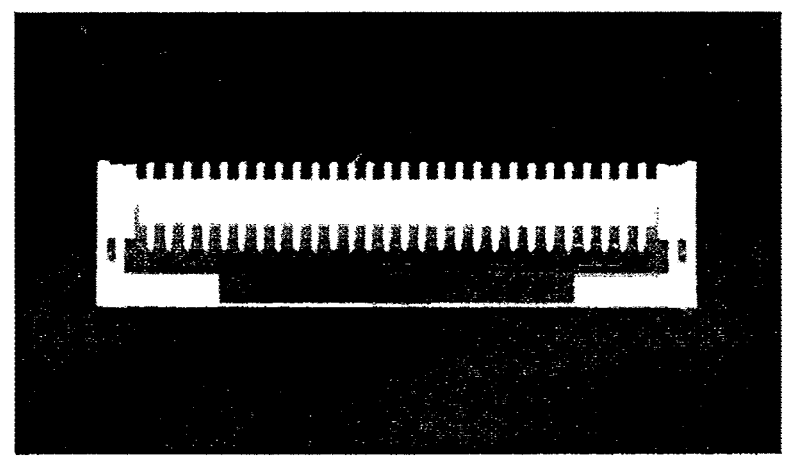
FIG. 2H is a view that shows an image of a connector component having a complex shape (2 of 2).

The method of component type automatic distinguishing by component type distinguishing means 16 is a hierarchical method that uses matching according to the dynamic programming (DP) technique disclosed in document 1 mentioned above. The method extracts, from a component image captured by camera 12, characteristic data, which is data that represents characteristics of a relevant component, compares the extracted characteristic data with reference characteristic data of multiple types of component registered in a database, and automatically distinguishes a type of component for which the two sets of data match most closely. Data of the projection luminance (the pixel frequency in the horizontal direction and the vertical direction) of an entire component region and zero cross pattern frequency is included in the characteristic data. In the component type automatic distinguishing method, high distinguishing performance is obtained for images of general components such as IC components having leads on four sides, chip components, mini mold components, connector components having simple shapes, and BGA components such as those shown in FIGS. 2A to 2E, but images of connector components having complicated shapes such as those shown in FIGS. 2G and 2H are not distinguished as connector components, and are incorrectly distinguished as odd form components such as that shown in FIG. 2F.

The reason for this is that a connector component is a component used in order to connect electrodes, and since connector components are created in various shapes to match the sizes and designs of finished products, when the projection luminance of an entire component region or the zero cross pattern frequency is used as the characteristic data, the DP distance from a reference increases due to changes in luminance such as internal structures of the component, or the like. Consequently, in a subspace method, it is considered that it is not possible to correctly distinguish a connector component with leads from an odd form component since the distances to subspaces of the reference are increased.

In such an instance, in the present disclosure, the periodic lines of leads arranged at equal pitch of a connector component are focused on in order to distinguish a connector component from an odd form component. A power spectrum image is created from a component image using an FFT in order to obtain a periodic characteristic, an HLAC characteristic is calculated from the power spectrum image, and discrimination of the presence of a lead is made by an identifier (the connector component distinguishing means 19) using a support vector machine. A region in which an FFT is applied to the component image is established from a presence probability of a lead using data for which regions in which a lead is present are already known. Hereinafter, an establishment method of such regions will be described.

A lead is a typical shape of an electrode of an electronic component, and normally, is attached toward an outer portion direction from a body portion of a component. Therefore, it is assumed that the probability that a lead will be present in the vicinity of the outer periphery of a component is high, and conversely, the probability that a lead will be present in a central portion of a component is low. With leads, there are many cases in which several to dozens of objects having the same shape are aligned in the same direction at equally spaced intervals. Rows of leads aligned in the same direction are referred to as lead groups, and regions in which lead groups are present in a component region are calculated from a component image in which lead groups are defined in advance. A decision of whether a component supplied to a position at which an image is to be captured by camera 12 is supplied at an orientation of 0°, 90°, 180°, or 270° is determined by an operation method of a user, and therefore, it is not possible to determine an orientation of a component in which the direction is correct from a component image.

In such an instance, a component image is rotated in four directions, a lead group defined by a worker is identified in the images, and an image (hereinafter, referred to as a "a lead group region image") that shows the probability of the presence of a lead group is created. A component region is normalized so as to form a square-shaped region in which the aspect ratio is 1:1 (512×512 [pixels]), and normalized so that a maximum quantity for identifying a lead group is a luminance of 255, in order to make an image of a region in which a lead group is present. In this case, a total of 215 component images was used.

Figure 3:
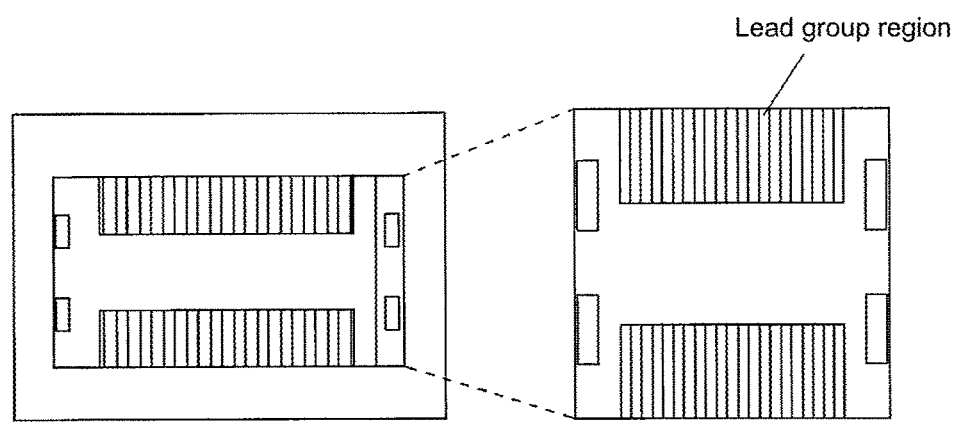
FIG. 3(a) is a view that illustrates a creation procedure (normalization) of a lead group region image.
FIG. 3(b) is a view that illustrates a sequence that calculates an average image by averaging 215 component images.
Figure 3:
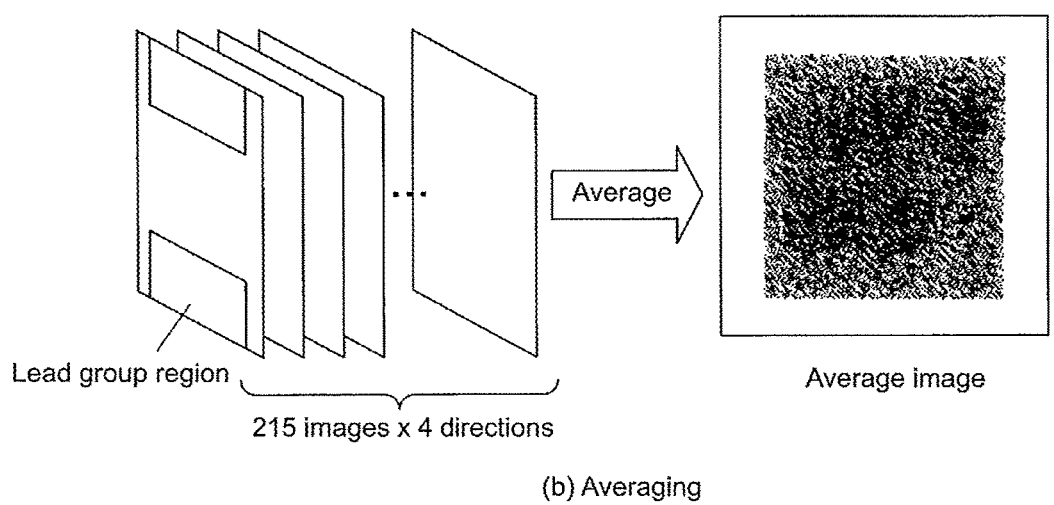
Figure 4:
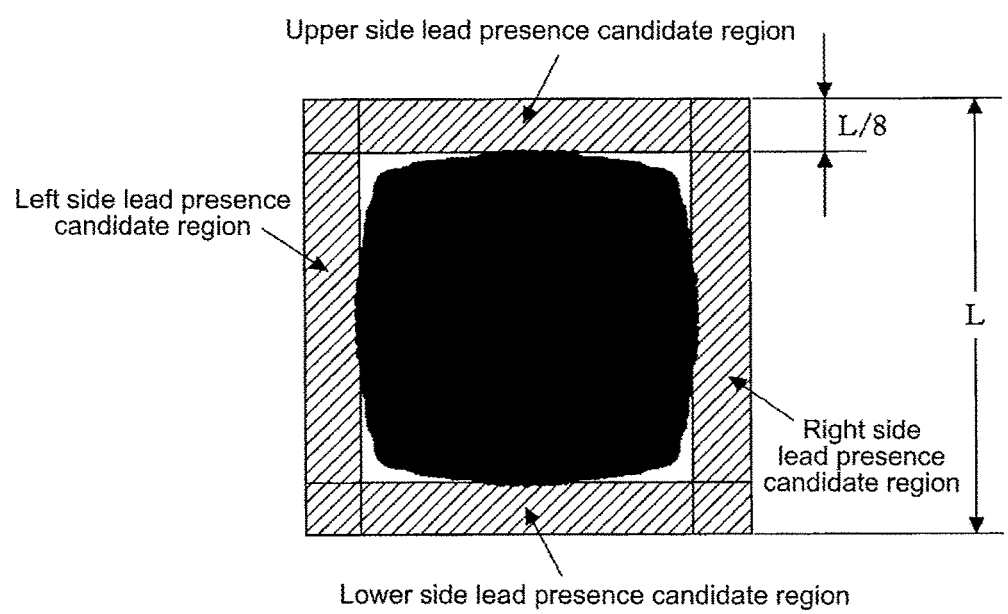
FIG. 4 is a view that illustrates a position of a lead presence candidate region of an average image.

FIG. 3 shows an average image obtained by a creation procedure (normalization) of a lead group region image and averaging of 215 component images. When the average image is viewed, it can be understood that lead groups are concentrated in the outer peripheral section of a component region. An image in which the obtained average image is binarized by using a discrimination analysis technique is shown in FIG. 4. From the results of the binarization, as shown in FIG. 4, lead presence candidate regions, which correspond to candidates for leads being present, are acquired in regions having a length of ⅛ of a length L of each side of the average image, and an image clipped by the lead presence candidate regions is set as a lead presence candidate region image. The lead presence candidate region image is acquired from four sites of top, bottom, left, and right, and the presence or absence of leads is distinguished from the lead presence candidate region images.

Next, a procedure for extracting a periodic characteristic from the lead presence candidate region image in order to distinguish the presence or absence of a lead will be described.

Figure 5:
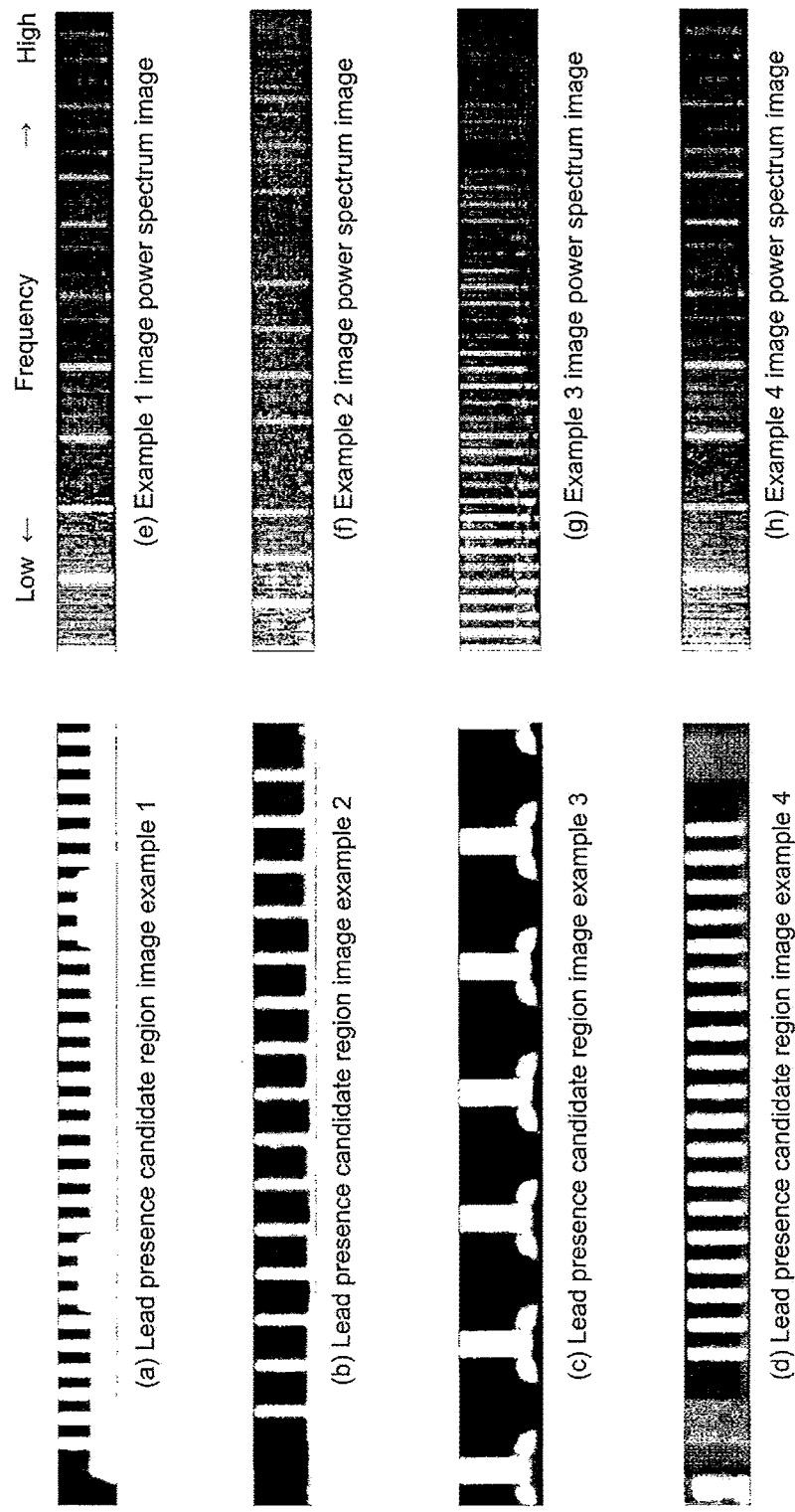
FIGS. 5(a) to 5(d) are views that show examples 1 to 4 of lead presence candidate regions in which leads are actually present.
FIGS. 5(e) to 5(h) are views that show power spectrum images created by respectively applying FFT to the images of examples 1 to 4.

Examples 1 to 8 of lead presence candidate region images acquired from component images determined to be odd form components by the above-mentioned hierarchical type component type automatic distinguishing method (component type discrimination means 16) of PTL 1, or the like, by using the above-mentioned method are shown in FIGS. 5($a$) to 5($d$) and 6($a$) to 6($d$). The lead presence candidate region image of each drawing is displayed in a manner in which the rotation thereof is corrected so that the outer side of all of the component regions are directed upward. Examples 1 to 4 of the lead presence candidate region images shown in FIGS.

5(a) to 5(d) are examples of regions in which a lead is actually present, and examples 5 to 8 of the lead presence candidate region images shown in FIGS. 6(a) to 6(d) are examples of regions in which a lead is not present. In examples 1 to 4 of the lead presence candidate region images shown in FIGS. 5(a) to 5(d), regular changes in luminance are observed in the horizontal direction.

Figure 6:
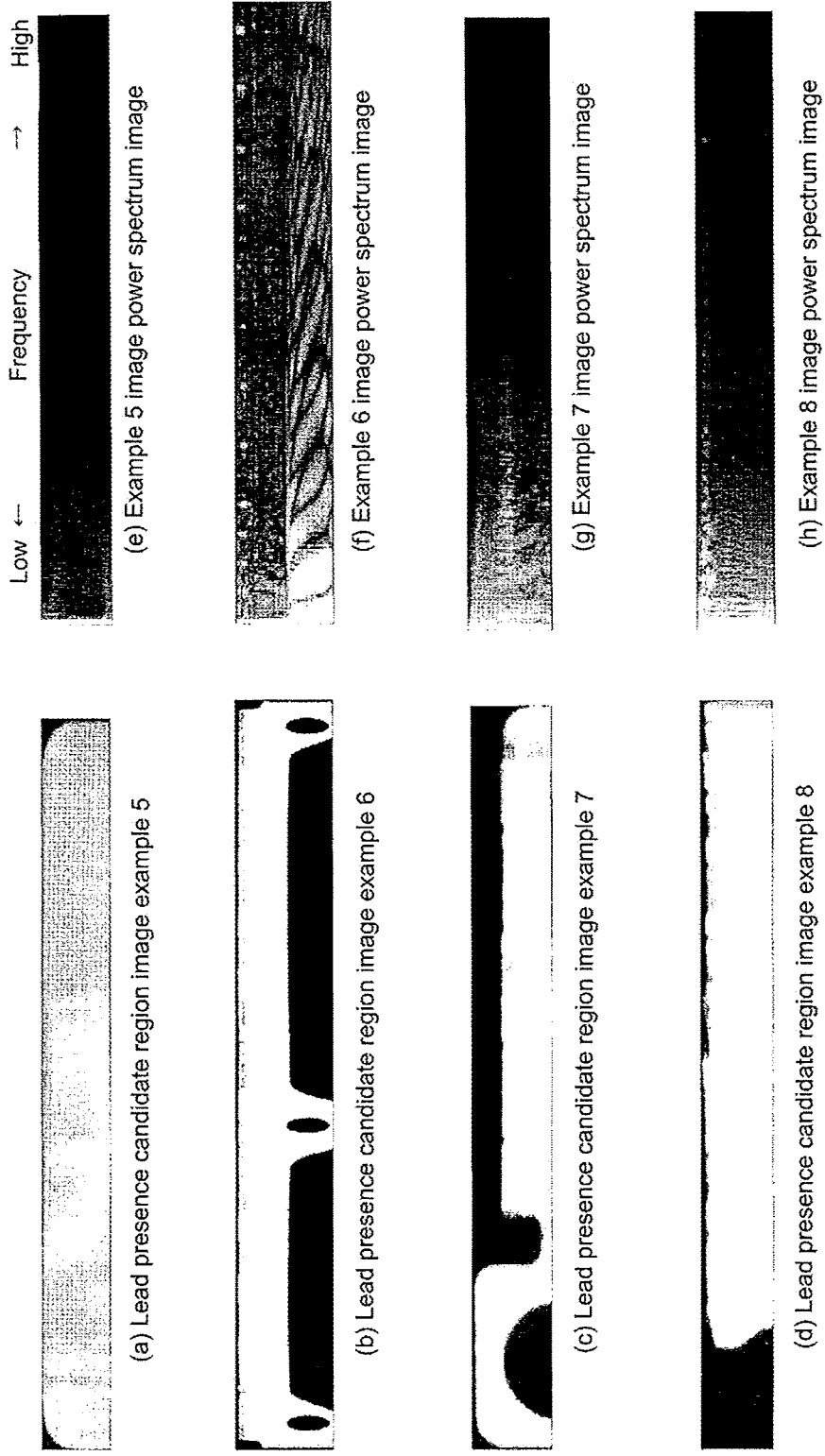
FIGS. 6(a) to 6(d) are views that show examples 5 to 8 of lead presence candidate regions in which leads are not present.
FIGS. 6(e) to 6(h) are views that show power spectrum images created by respectively applying FFT to the images of examples 5 to 8.

In such an instance, a power spectrum image is created by applying an FFT for each scanning line in the horizontal direction to the lead presence candidate region images. Since an amount of data of a factorial of 2 is required when applying an FFT, examples 1 to 8 of the lead presence candidate region images shown in FIGS. 5(a) to 5(d) and FIGS. 6(a) to 6(d) are created in a manner that extends so that the width directions are all 512 [pixels]. Each of the obtained power spectrum images of examples 1 to 8 is shown in FIGS. 5(e) to 5(h) FIGS. 6(e) to 6(h). As shown in FIGS. 5(e) to 5(h), in images in which a lead is actually present, periodic vertical lines can be seen in the power spectrum image, but as shown in FIGS. 6 (e) to 6(h), periodic vertical lines cannot be seen in images of regions in which a lead is not present.

In the present disclosure, a method that treats an obtained power spectrum image as a texture, acquires a higher-order local auto-correlation (HLAC) characteristic from the power spectrum image, and determines whether a component is a component having a lead by setting the HLAC characteristic as a characteristic amount is proposed. Generally, HLAC is used in various image processing, such as character recognition and face recognition, and is used as a characteristic amount having high versatility. An Nth order auto-correlation function in which an auto-correlation function is extended to a higher-order is represented by the following Formula.

Equation 1

$$x(a_1, \ldots, a_N) = \int I(r)I(r+a_1) \ldots I(r+a_N)dr \quad (1)$$

Figure 7:
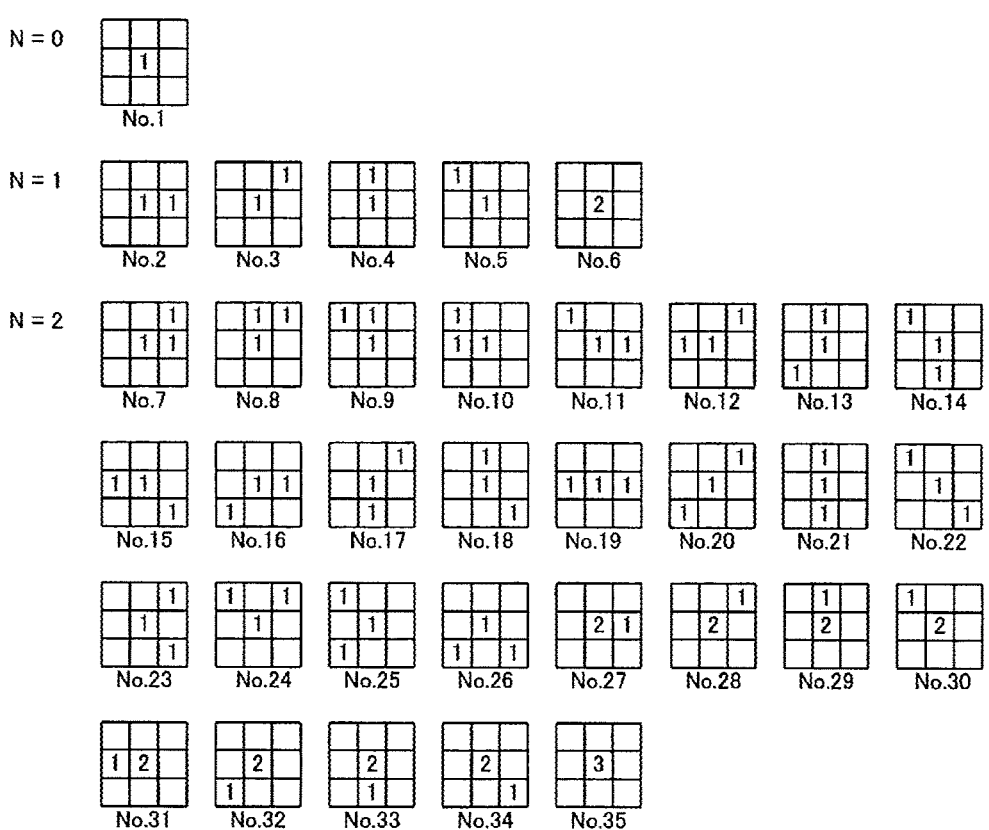
FIG. 7 is a view that shows mask patterns of HLAC.

In this instance, I is an image, and a displacement vector r and N displacement vectors $a_i$ (I=0, ..., N) are two-dimensional vectors having a coordinate in the image. A combined number of displacement vectors is a dimension of a characteristic vector. When N is limited to 2 in a local region of 3×3, a 35-dimension characteristic vector is obtained for a gradation image. 35 combination patterns are shown in FIG. 7.

HLAC has two properties of additivity and positional invariance. In the vertical line patterns in the power spectrum images shown in FIGS. 5(e) to 5(h), appearance positions are established by the inter-lead pitch. It is considered that the use of the positional invariance property of HLAC is suited to recognition since it is possible to obtain independent characteristics for the extension of data when applying an FFT and the inter-lead pitch of a component. In addition, since the height of a power spectrum image changes depending on a component region in a source component image, a characteristic amount obtained by normalizing the characteristic amount of the 35 dimensions obtained by the HLAC characteristic is used as the characteristic amount.

Next, a distinguishing method of a connector component that uses an SVM will be described. Since the distinguishing whether a lead presence candidate region image created by using the above-mentioned method is a region in which a lead is actually present, an SVM, which has an established reputation as a binary classification of high-dimension data, is used. A soft margin SVM is used in consideration of the fact that there are overlapping regions in class intervals, and a Radial Basis Function (RBF) kernel is used as a kernel. When a setting of teacher data and a label is set as (xn, tn), a slack variable is set as ξn, and C is set as a penalty, an optimization problem of the SVM is represented in the following manner.

Equation 2

$$\min_{w,b,\xi} C\sum_n \xi_n + \frac{1}{2}\|w\|^2 \quad (2)$$

subject to $t_n(w^T\phi(x_n)+b) \geq 1-\xi_n$ $\xi_n \geq 0$

In addition, the RBF kernel is represented in the following manner with γ set as a parameter.

Equation 3

$$K(x,x') = \exp(-\gamma\|x-x'\|^2) \quad (3)$$

Since adjustment of the parameters C and γ have an effect on the identification performance, optimum C and γ are established by performing n-fold cross validation using training data.

In the above-mentioned manner, in the hierarchical type method of the related art that uses DP matching, there is a large amount of error in the distinguishing of a connector component, and there are a large number of cases of incorrect distinguishing as an odd form component. In such an instance, in the present disclosure, the computer 11 adds distinguishing processes by power spectrum image creation means 17, HLAC characteristic extraction means 18, and connector component discrimination means 19 to component type discrimination means 16, which distinguishes the type of a component by using a hierarchical type method that uses DP matching by executing the component type automatic distinguishing program of FIG. 8, which will be mentioned later, and improves the distinguishing performance of component types as a result of distinguishing components for which it is distinguished that a lead group is present in any one of the lead presence candidate region images in the four directions of up, down, left, and right of a component image as connector components.

Hereinafter, the process content of the component type automatic distinguishing program of FIG. 8 executed by the computer 11 will be described. When the program is started, firstly, in Step 101, component images are acquired by rotating a component supplied to a position at which an image is to be captured by camera 12 in the four directions of 0°, 90°, 180°, and 270°, and capturing images of the component. Thereafter, the process proceeds to Step 102, and distinguishing the type of the component is made by using a hierarchical type method that uses DP matching. The hierarchical type method is disclosed in detail in PTL 1, and extracts characteristic data from a component image, compares the extracted characteristic data with reference characteristic data of multiple types of component registered in a database, and automatically distinguishes a type of component for which the two sets of data match most closely. The processing functions of Steps 101 and 102 function as component type distinguishing means 16.

Thereafter, the process proceeds to Step 103, it is determined whether the component was distinguished as an odd form component by the hierarchical type component type distinguishing process of Step 102 above, and in a case in which the component is distinguished as an odd form component, the process proceeds to Step 104, and a power spectrum image is created by applying an FFT to the component image distinguished as an odd form component. In this case, a power spectrum image is created by applying an FFT for each scanning line to lead presence candidate regions corresponding to candidates for a lead being present in the component image distinguished as an odd form component. The processing function of Step 104 functions as the power spectrum image creation means 17.

Thereafter, the process proceeds to Step 105, and an HLAC characteristic is extracted from the power spectrum image. The processing function of Step 105 functions as HLAC characteristic extraction means 18. Thereafter, the process proceeds to Step 106, and a connector component with leads is distinguished from an odd form component using the HLAC characteristic. The processing function of Step 106 functions as connector component discrimination means 19.

Thereafter, the process proceeds to Step 107, and image processing component data is created by extracting characteristic data of the relevant component from the component image in accordance with a distinguishing result of a component type. The processing function of Step 107 functions as component data creation means 20. Additionally, in a case in which a component is distinguished as a connector component with leads, an image processing algorithm that detects damage and bending of a lead may be automatically selected.

Meanwhile, in Step 103, if it is determined that the component was not distinguished as an odd form component by the hierarchical type component type distinguishing process of Step 102, the process proceeds to Step 107 skipping Steps 104 to 106 above, and image processing component data is created by extracting characteristic data of the relevant component from a component image in accordance with the distinguishing result of the component type.

The present inventors carried out an evaluation experiment evaluating the component type automatic distinguishing method of the present disclosure, and the evaluation experiment will be described below.

Figure 9:
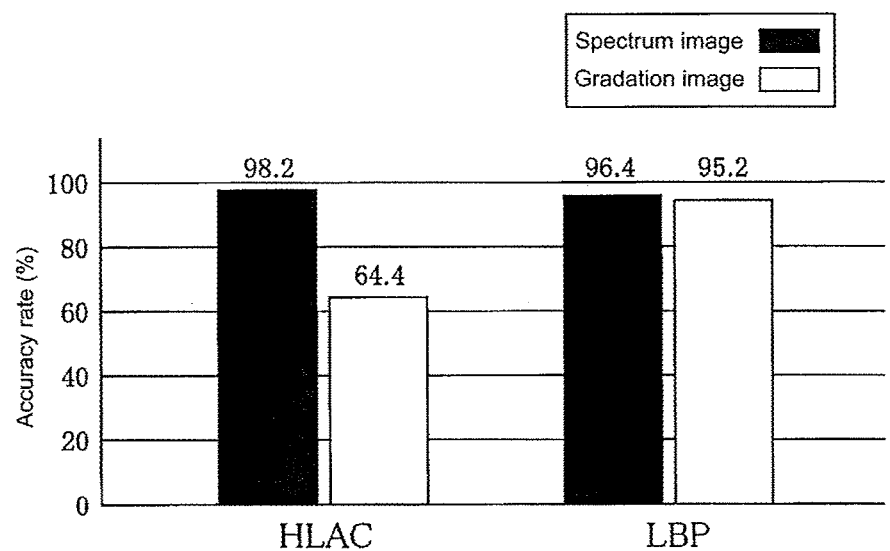
FIG. 9 is a view that compares a case in which HLAC is used and a case in which LBP is used and shows an accuracy rate for a spectrum image and an accuracy rate for a gradation image.

Firstly, in order to evaluate the distinguishing performance of a lead presence candidate region image, lead presence candidate region images were acquired from lead-type components (IC components and connector component) and odd form components using a creation method of the lead presence candidate region images, and were classified as images having a lead group (Positive images) and images not having a lead group (Negative images). As a result of the classification, 441 positive images and 737 negative images were obtained. An accuracy rate was calculated for the obtained images by using 10-fold cross validation. In order to evaluate the effectiveness of the characteristic amount acquired in a frequency domain, a case of obtaining an HLAC characteristic was compared with a source image. In addition, in order to compare the characteristic amount, evaluation was performed by using a Local Binary Pattern (LBP) for each image. LBPs are used in texture recognition and face recognition, and effective results have been reported. The experimental results are shown in FIG. 9. According to the experimental results, obtaining characteristics in a frequency domain was effective in methods that used both HLAC and LBP. In addition, when HLAC and LBP are compared, a higher accuracy rate of a spectrum image of 98.2[%] was obtained in a case of using HLAC than a case of using LBP (96.4[%]). The HLAC characteristic amount is 35 dimensions, and in comparison with the 256 dimensions of LBP, a higher identification performance is obtained at a characteristic amount of a low dimension number.

Next, in order to evaluate the performance as an automatic identifier, distinguishing results of a method of the related art (the hierarchical type method of PTL 1) are shown in Table 1, and distinguishing results of the method of the present disclosure are shown in Table 2.

TABLE 1

Distinguishing results of method of related art

| | | Distinguishing result | | | | | | | |
|---|---|---|---|---|---|---|---|---|---|
| Type of component | | Chip component | Mini mold component | IC component | BGA component | Connector component | Odd form component | Total | Accuracy rate [%] |
| Component subject for distinguishing | Chip component | 162 | | | | | 1 | 163 | 99.4 |
| | Mini mold component | 4 | 139 | | | | 3 | 146 | 95.2 |
| | IC component | | | 100 | | | 1 | 101 | 99.0 |
| | BGA component | 2 | | | 104 | | | 106 | 98.1 |
| | Connector component | | | 4 | | 46 | 65 | 115 | 40.0 |
| | Odd form component | | 1 | | | | 116 | 117 | 99.1 |
| Total | | | | | | | | 748 | 89.2 |

TABLE 2

Distinguishing results of method of present disclosure

| Type of component | | Chip component | Mini mold component | IC component | BGA component | Connector component | Odd form component | Total | Accuracy rate [%] |
|---|---|---|---|---|---|---|---|---|---|
| Component subject for distinguishing | Chip component | 162 | | | | | 1 | 163 | 99.4 |
| | Mini mold component | 4 | 139 | | | | 3 | 146 | 95.2 |
| | IC component | | | 100 | | | 1 | 101 | 99.0 |
| | BGA component | 2 | | | 104 | | | 106 | 98.1 |
| | Connector component | | | 4 | | 105 | 6 | 115 | 91.3 |
| | Odd form component | | 1 | | | 8 | 108 | 117 | 92.3 |
| Total | | | | | | | | 748 | 96.0 |

When the distinguishing results of Tables 1 and 2 are viewed, in the method of the present disclosure, the distinguishing performance of a connector component is greatly improved at 91.3[%] from the 40.0[%] of the related art. Incorrect distinguishing as an IC component remains in the same manner as before, but since a positioning process used in IC components and connector components detects a position of leads in the same manner, this incorrect distinguishing is not a problem.

Figure 10:
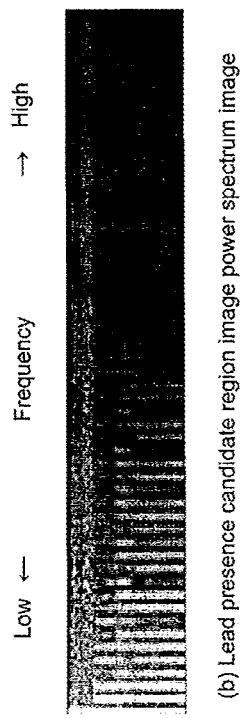
FIG. 10(a) is a view that shows an example of an image of an odd form component that is incorrectly distinguished as a connector component.
FIG. 10(b) is a view that shows a power spectrum image of a lead presence candidate region of the component image of (a).
Figure 10:
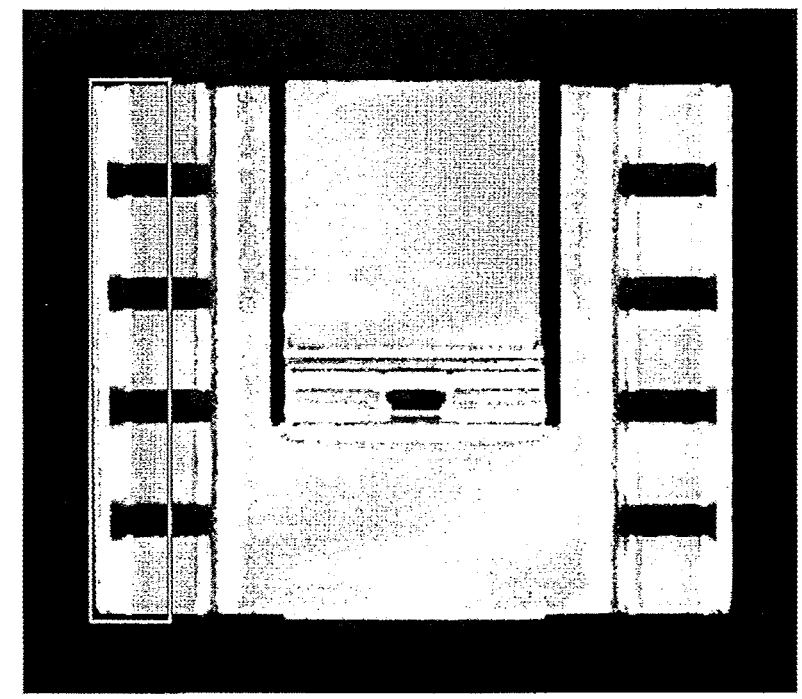

Meanwhile, the number of cases of incorrect distinguishing of components that are originally odd form components as connector components is slightly increased. An example of an image of an odd form component incorrectly distinguished as a connector component is shown in FIG. 10. The reason for this is that there are objects in which periodically aligned shapes appear in the outer peripheral portion of the component region of the odd form component, and there is a possibility that such odd form components in which periodically aligned shapes appear will be incorrectly distinguished. Regarding such components, since it is recognized that there is not a lead in a recognition process of a lead in a later step (an image processing component data creation step), it is possible to recognize such components as odd form components.

Figure 11:
FIG. 11(a) is a view that shows an example of an image of a connector component incorrectly distinguished as an odd form component.
FIG. 11(b) is a view that shows a power spectrum image of a lead presence candidate region of the component image of (a).
Figure 11:
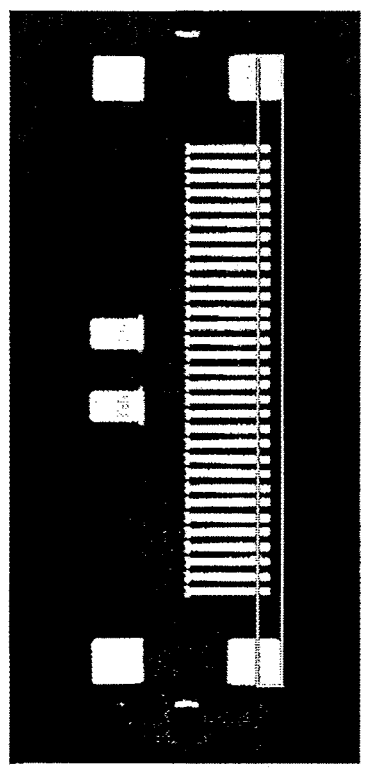

In addition, incorrect discrimination as an odd form component of 8.7[%] remains for connector components. An example of an image of a connector component incorrectly distinguished as an odd form component is shown in FIG. 11. As can be understood from FIG. 11, a lead group is only included in a region of approximately half the lead presence candidate region image on the lower side of the component image, and it is considered that the characteristic of the periodic vertical line pattern is reduced. There is room for improvement relating to this incorrect distinguishing by reconsideration of the lead presence candidate region, or the like.

As is evident from the above-mentioned description, as a result of using the method of the present disclosure, the distinguishing performance of a connector component is greatly improved at 91.3[%] from the 40.0[%] for component images distinguished as odd form components by the method of the related art (the hierarchical type method of PTL 1). It was confirmed that the distinguishing performance for all component types was improved to 96.0[%] from 89.2[%]. In a component image, it was possible to confirm that high distinguishing performance is obtained by acquiring an HLAC characteristic amount from a power spectrum image acquired from regions in which the probability of a lead group being present is high, and using an SVM in a discriminator. However, regardless of whether a component is a connector component, cases in which connector components in which a lead group is present in a central portion of the component are incorrectly distinguished as odd form components remain. It is considered that such problems can be solved if a highly-accurate classifier that uses a method such as reconsideration of the lead presence candidate region or combination of identification of lead shapes is constructed.

Additionally, the present disclosure is not limited to the above-mentioned example, and can, as appropriate, be implemented in a manner in which the system configuration, and the like, thereof are altered, or the like, and naturally, can be altered in various manners within a range that does not depart from the gist of the disclosure.

REFERENCE SIGNS LIST

11: computer, 12: camera, 16: component type discrimination means, 17: power spectrum image creation means, 18: HLAC characteristic extraction means, 19: connector component discrimination means, 20: component data creation means

The invention claimed is:

1. A component type automatic distinguishing method that automatically distinguishes a type of a component by processing a component image captured by a camera, the method comprising:
   a power spectrum image creation process for creating a power spectrum image from the component image by applying a fast Fourier transform (FFT) for each scanning line to a region corresponding to a candidate for a lead being present in a component image;
   a higher-order local auto-correlation (HLAC) characteristic extraction process for calculating an HLAC characteristic from the power spectrum image in order to extract a periodic characteristic of the power spectrum image; and
   a connector component distinguishing process for distinguishing whether the component is a connector component having a lead using the higher-order local auto-correlation characteristic.

2. The component type automatic distinguishing method according to claim 1, wherein, in the connector component distinguishing process, whether the component is a connector component with leads is distinguished by learning a characteristic amount of the higher-order local auto-correlation characteristic using a support vector machine (SVM).

3. An image processing component data creation method that creates image processing component data used during image recognition of a component to be mounted by a component mounting machine, the method comprising:
creating the image processing component data by extracting characteristic data of the component from a component image in accordance with a type of component distinguished by the component type automatic distinguishing method according to claim 1.

4. A component type automatic distinguishing method that automatically distinguishes a type of a component by processing a component image captured by a camera, the method comprising:
a power spectrum image creation process for creating a power spectrum image from the component image using a fast Fourier transform (FFT);
a higher-order local auto-correlation (HLAC) characteristic extraction process for calculating an HLAC characteristic from the power spectrum image in order to extract a periodic characteristic of the power spectrum image;
a connector component distinguishing process for distinguishing whether the component is a connector component having a lead using the higher-order local auto-correlation characteristic; and
a component type distinguishing process for extracting characteristic data of the component from the component image captured by the camera, comparing the extracted characteristic data with reference characteristic data of multiple types of component registered in a database, and distinguishing a type of component for which the two sets of data match most closely,
wherein a connector component with leads is distinguished from an odd form component by performing the power spectrum image creation process, the HLAC characteristic extraction process, and the connector component distinguishing process for a component image distinguished as an odd form component by the component type distinguishing process.

5. A component type automatic distinguishing system that automatically distinguishes the type of a component by processing a component image captured by a camera, the system comprising:
processing circuitry configured to
create a power spectrum image from a component image by applying a fast Fourier transform (FFT) for each scanning line to a region corresponding to a candidate for a lead being present in a component image;
calculate a higher-order local auto-correlation (HLAC) from the power spectrum image in order to extract a periodic characteristic of the power spectrum image; and
distinguish whether the component is a connector component having a lead using the higher-order local auto-correlation characteristic.

6. The component type automatic distinguishing system according to claim 5, wherein the the processing circuitry distinguishes whether the component is a connector component with leads by learning a characteristic amount of the higher-order local auto-correlation characteristic using a support vector machine (SVM).

7. An image processing component data creation system that creates image processing component data used during image recognition of a component to be mounted by a component mounting machine, the system comprising:
component data creation circuitry configured to create the image processing component data by extracting characteristic data of the component from a component image in accordance with a type of component distinguished by the component type automatic distinguishing system according to claim 5.

8. A component type automatic distinguishing system that automatically distinguishes a type of a component by processing a component image captured by a camera, the system comprising:
processing circuitry configured to
create a power spectrum image from a component image by applying a fast Fourier transform (FFT) for each scanning line to a region corresponding to a candidate for a lead being present in a component image;
calculate a higher-order local auto-correlation (HLAC) from the power spectrum image in order to extract a periodic characteristic of the power spectrum image;
distinguish whether the component is a connector component having a lead using the higher-order local auto-correlation characteristic;
extract characteristic data of the component from the component image captured by the camera;
compare the extracted characteristic data with reference characteristic data of multiple types of component registered in a database;
distinguish a type of component for which the two sets of data match most closely,
create a power spectrum image and calculate the higher-order local auto-correlation characteristic for a component image distinguished as an odd form component; and
distinguish a connector component with leads from the odd form component.

* * * * *